United States Patent Office 3,460,983
Patented Aug. 12, 1969

3,460,983
FATTY ACID BIGUANIDES AND THEIR USE FOR IMPREGNATING LEATHER
Robert Biedermann, Riehen, Switzerland, assignor to Geigy Chemical Corporation, Greenburgh, N.Y., a corporation of Delaware
No Drawing. Filed Nov. 17, 1965, Ser. No. 508,379
Claims priority, application Switzerland, Dec. 3, 1964, 15,623/64
Int. Cl. B44d 1/32; C14c 9/02
U.S. Cl. 117—142                        12 Claims

ABSTRACT OF THE DISCLOSURE

A fatty acid biguanide produced by reacting (i) a hydrohalide of a primary aliphatic amine wherein the aliphatic radical has from 12 to 20 carbon atoms, and (ii) a dicyandiamide, said reactants being in the molar ratio respectively of from 1:0.8 to 1:1.5. The reaction product is then dissolved in a lower alkanol, neutralizing the reaction mixture to yield a free biguanide base, separating from the reaction solution insoluble products, adding to the separated solution from 0.5 to 2.5 equivalents, per equivalent of said amine, of aliphatic hydrocarbon carboxylic acid having from 12 to 20 carbon atoms and then recovering the resulting fatty acid biguanide from the reaction mixture. A method of imparting hydrophobic properties to leather which comprises impregnating leather with the above described fatty acid biguanide.

---

The present invention concerns new, fatty acid biguanides which are excellently suitable for the impregnation of leather, processes for their production; it further relates to leather impregnating agents which contain these biguanides as well as to leather rendered hydrophobic by impregnation therewith.

Fatty acid biguanides according to the invention which are valuable impregnating agents for leather are produced by reacting 1 mol of hydrohalide, especially hydrochloride of an aliphatic primary amine having an aliphatic radical of more than 12 and preferably from 12 to 20 carbon atoms with, per mol thereof, 0.8 to 1.5 mol of dicyandiamide at temperatures above 100° C. and preferably not more than 160° C., dissolving the reaction product obtained in a low molecular alcohol especially a lower alkanol, neutralizing the hydrohalic, e.g. hydrochloric acid which is set free in the reaction mixture, at a temperature below 50° C. with the necessary equivalent amount of alkali metal hydroxide, preferably in concentrated aqueous solution, separating the solution e.g. by filtration from the alkali halide formed and reacting the resulting liquor containing the free fatty acid biguanide base with 0.5 to 2.5 equivalents of higher aliphatic carobxylic acid preferably higher fatty acid having more than 12, and especially from 12 to 20 carbon atoms and recovering the resulting fatty acid biguanide from the reaction mixture, e.g. by concentration in vacuo at temperatures below 100° C.

The compounds obtained according to the invention are suitable either alone or in combination with neutral mineral oils and/or with neutral oils or fats containing no sulphonic acid groups and/or with waxes, for the impregnation of leather tanned in various ways, whereby the leather is rendered hydrophobic over a long period of time, namely for several weeks and even months.

At the same time, those properties which distinguish leather from other known materials used as footwear, e.g. rubber and the like, especially "breathing" properties and freedom from accumulating charges of static electricity are fully preserved. Moreover, even upon repeated application the periods for which the leather is rendered hydrophobic no not become shorter.

In the process according to the invention, fatty amines, i.e. both saturated as well as unsaturated aliphatic primary amines having more than 12 carbon atoms such as myristyl, palmityl, stearyl, palmitoleyl, oleyl, linoleyl or linolenyl amine, or mixtures thereof can be used. Preferably the hydrochloride is used as hydrohalide.

Although in the reaction of the hydrohalides of these amines with dicyandiamide, mainly the corresponding biguanides are formed, the amount of dicyandiamide used in this reaction must be held within the limits set forth above, so that the end products according to the invention may impart the desired hydrophobic properties to leather impregnated with them. Use of more than 1.3 mols of dicyandiamide, leads to byproducts being formed in the fatty acid biguanide according to the invention, which are insoluble in low alcohols, so that the most satisfactory results are obtained when using from 1 to 1.3 mols of dicyandiamide. The reaction of the amines with dicyandiamide is preferably performed at temperatures between 135 and 150° C. and, especially, between 140 and 145° C. Higher temperatures cause the products to be dark colored. The reaction products obtained are soluble in lower alcohols, particularly in aliphatic lower alcohols such as ethanol, butanol, isopropanol and glycol monomethyl ethers, cycloaliphatic lower alcohols such as cyclohexanol and aralipahtic lower alcohols such as benzyl alcohol. Lower alkanols and among them isopropanol are preferred. The halohydric acid is neutralized in alcoholic solution, preferably by adding concentrated aqueous sodium hydroxide solution or aqueous potassium hydroxide solution. This is done at as low a temperature as possible, most advantageously between 40 and 45° C., in order to prevent splitting off of ammonia during the neutralization. The alkali halide which then precipitates, is separated by filtration.

The reaction of the free biguanide base thus obtained with the higher fatty acid is best performed in alkanolic and, particularly, in isopropanolic solution. The alcohol is subsequently eliminated by evaporation in vacuo; temperatures higher than 100° C. are to be avoided in this step in order to check the formation of insoluble side-products. In this reaction, both saturated aliphatic hydrocarbon monocarboxylic acids having more than 12 carbon atoms such as myristic, palmitic, stearic, arachic, behenic, lignoceric, cerotic and melissic acid, as well as unsaturated aliphatic hydrocarbon monocarboxylic acids such as oleic, galoleic, erucic, linoleic, linolenic, eleostearic, clupanodonic acid and tall oil, and also higher alkylated hydrocarbon polycarboxylic acids such as decyl-succinic acid, dodecyl-succinic acid or mixtures of these acids can be used.

The constitution of the fatty acid used influences the waterproofing properties of the new products; unsaturated fatty acids have an even better hydrophobic effect than saturated acids. Also, the relationship of biguanide to fatty acids affects the hydrophobic action of the products obtained according to the invention. Thus, for the impregnation of vegetable-tanned leather, more fatty acid has to be used to attain the optimal effect than when preparing products according to the invention which are to serve for the impregnation of leathers tanned by a combination of chrome and vegetable tanning.

Due to the possibility of varying the composition of the compounds described, products can be produced which are adapted to producing in a leather, depending on the way in which the leather has been tanned, a maximum impermeability. It has been found that the specific tanning method has a decisive influence on the behavior of the leather towards water. Whilst vegetable-tanned leather is waterproofed with relative ease, leather tanned by a combination of chrome and vegetable tanning is very sensitive to water. Leather tanned by both the above methods can, to all intents and purposes, be permanently waterproofed with the products obtained according to the invention. As has been explained above, products specifically suited for imparting optimal impermeability to all of these types of leather produced according to the invention can be obtained in each of these types of leather.

The good solubility of the biguanides obtained according to the invention in pure and in aqueous isopropanol as well as in other lower molecular alcohols greatly simplifies their application. The leather is best made impermeable in the dressed state either by soaking or by applying the impregnating liquor to the inner or flesh side. This has the great advantage that sole leather, for example, can be treated in the rolled state, while the hitherto conventional impregnation before rolling, makes the moistening of the leather and, thus, the rolling of the leather more difficult. Making the leather impermeable in the dressed stage in the aforesaid manner, also enables the leather to be sorted before impregnation so that only suitable leathers are given a suitable treatment.

The various possibilities of combination and application of the products according to the invention enable hydrophobic effects to be attained on the most varied leathers which have been vegetable tanned or combined chrome-vegetable tanned, which effects could not have been attained with the known products hitherto. The water-resistant effect of the products according to the invention is deteriorated neither by excess tannin nor by neutral salts which may be present in the leather; solely the presence of free strong acids, which normally ought not to be found in leather, has a deteriorating effect. In particular, in comparison with impregnating agents based on silicone which only have a superficial action, the products obtained according to the invention have a deeper and more lasting impregnation effect.

A lasting waterproofing of the leather is attained with 5 to 25%, and preferably 8 to 15% by weight of the impregnating agents, calculated on the dry weight of the unimpregnated leather, the amount of impregnating agent being dependent on the type of tanning and on the nature of the leather.

Lower aliphatic or aromatic amines used in the condensation step with dicyandiamide lead to products which fail to impart to leather the desired long-lasting hydrophobic properties.

The following non-limitative examples illustrate the invention. Temperatures are given therein in degrees centigrade and the percentages are percentages by weight.

Example 1

269 g. of stearylamine are well mixed with 105 g. of 37% hydrochloric acid and the water and excess hydrochloric acid are distilled off at a raised temperature. 90 g. of dicyandiamide are added at 130° and, after well mixing, the mass is heated for 4 hours at 143–145° while stirring. After this time, it is cooled to 100°, 280 ml. of isopropanol are poured in slowly and the whole is stirred at 80° until the reaction product has dissolved. It is then cooled to 40° and 100 g. of 40% sodium hydroxide solution are slowly added to the isopropanolic solution while stirring well. After 2 hours, the precipitated sodium chloride is filtered off from the solution and rinsed with 40 ml. of isopropanol. 250 g. of oleic acid are added to the result combined solution and the isopropanol is distilled off in vacuo; the inner temperature should finally not exceed 100°.

The product obtained is a pale brown mass which is as soft as wax. Sole leather of 4 mm. thickness, tanned by combined chrome-vegetable, which has been impregnated with 12% of this product, calculated on the weight of the leather, lets no water through after testing for 48 hours on the Bally Permeometer. At the end of this time it has taken up 21% of water.

Example 2

As described in Example 1, the hydrochloride of 267 g. of oleylamine is heated with 100 g. of dicyandiamide for 4 hours at 143–145° while stirring. After cooling to 90°, the mass is dissolved in 280 ml. of isopropanol and, at 40°, the hydrochloric acid is neutralised with 115 g. of 40% potassium hydroxide solution. After stirring for 2 hours, the potassium chloride is filtered off and rinsed well with 40 ml. of isopropanol. 410 g. of double refined tall oil of an acid number of 193 are then added to the combined filtrates and the whole is evaporated in vacuo at 90°. The concentrated residue is a soft brownish mass.

To produce a leather impregnating agent, the product so obtained is mixed with 210 g. of colourless Vaseline oil of specific weight 0.85.

A pure vegetable tanned sole leather of 4.5 mm. thickness which has been impregnated by soaking with 12% of this agent, calculated on the weight of the leather, lets no water through after 48 hours testing on the Bally Permeometer. At the end of this time the leather has taken up 28% of water.

Example 3

The hydrochloride from 274 g. of a mixture of medium molecular weight of 274, consisting of 2% of myristylamine, 24% of palmitylamine, 28% of stearylamine and 46% of oleylamine is well mixed, as described in Example 1, with 95 g. of dicyandiamide, the whole is heated for 5 hours at 142–144° while stirring and then cooled to 90°. The reaction mass is dissolved in 280 ml. of isopropanol and, after cooling to 40°, 100 g. of 40% sodium hydroxide solution are added. After stirring for 2 hours, the precipitated sodium chloride is filtered off and washed well with 40 ml. of isopropanol. 400 g. of oleic acid are added to the combined filtrates and the mixture of isopropanol and water is removed in vacuo at 90–100°. The mass which remains is a pale brown paste.

To produce a leather impregnating agent, the product so obtained is mixed with 200 g. of colourless vaseline oil of specific weight 0.85.

A chrome/vegetable tanned water resistant upper leather which has been impregnated by soaking with 14% of this agent, calculated on the weight of the leather, still lets no water through after 8 hours' testing on the Bally Penetrometer. At the end of this time, the leather has taken up 3.6% of water.

Example 4

304 g. of oleylamine hydrochloride are melted and 110 g. of dicyandiamide are added at 130°. After mixing well, the mass is heated for 4 hours at 143–145° while stirring, then cooled to 90°, dissolved completely in 280 ml. of isopropanol, again cooled to 40 and 100 g. of 40% sodium hydroxide solution are added to neutralise the hydrochloric acid. After stirring for 2 hours at 40–45°, the sodium chloride formed is filtered off, well washed with 40 ml. of hot isopropanol and the filtrates are combined. 270 g. of linseed oil fatty acid of acid number 187 and 150 parts of vaseline oil are then added to the clear solution obtained, after which the mixture of isopropanol and water is distilled off in vacuo at 90°.

The impregnating agent obtained is a brownish soft mass which dissolves well in a mixture of 80 ml. of isopropanol and 20 ml. of water. When tested on the Bally Permeometer for 48 hours, chrome/vegetable tanned sole leather which has been impregnated by application to the flesh side of 12% of this product, calculated on the weight of the leather, still lets no water through. At the end of this time the leather has taken up 27% of water.

Example 5

90 g. of dicyandiamide are added at 140° to a stirred melt of 152 g. of oleylamine hydrochloride and 155 g. of stearylamine hydrochloride. After mixing well, the mass is heated for 4 hours at 143–145° while stirring. On completion of the reaction, it is cooled to 90° and dissolved in 350 ml. of cyclohexanol. When a complete solution is attained, it is cooled to 40° and the hydrochloric acid is neutralised with 100 g. of 40% sodium hydroxide solution, care being taken that the temperature does not exceed 45°. After stirring for 2 hours, the sodium chloride formed is filtered off and, after washing the sodium chloride, 140 g. of oleic acid and 142 g. of stearic acid are added to the filtrate. The cyclohexanol is then distilled off in vacuo at 90°.

After mixing the brownish paste which remains with 180 g. of hydrophobic vaseline oil, it is suitable for the impregnation of leathers which are combined chrome-vegetable tanned.

I claim:
1. A fatty acid biguanide produced by reacting:
  (i) hydrohalide of a primary aliphatic amine, the aliphatic radical of which has from 12 to 20 carbon atoms, and
  (ii) dicyandiamide, in a molar ratio in the range of from about 1:0.8 to 1:1.5 at a temperature above 100° C. and up to about 160° C.,
    dissolving the reaction product in lower alkanol, neutralizing the reaction mixture to set free the biguanide base,
    separating from the reaction solution insoluble reaction products formed, adding to the separated solution from 0.5 to 2.5 equivalents, per equivalent of said amine, of higher aliphatic hydrocarbon carboxylic acid of from 12 to 20 carbon atoms and thereby reacting the latter with said biguanide base, and
    recovering the resulting fatty acid biguanide from the reaction mixture.
2. A fatty acid biguanide as defined in claim 1, wherein the hydrohalide of the primary aliphatic amine is the hydrochloride.
3. A fatty acid biguanide as defined in claim 1, wherein the hydrohalide of the primary aliphatic amine is the hydrochloride of stearyl amine.
4. A fatty acid biguanide as defined in claim 1, wherein the hydrohalide of the primary aliphatic amine is the hydrochloride of oleyl amine.
5. A fatty acid biguanide produced as described in claim 1, wherein the reaction between amine hydrohalide and dicyandiamide is carried out at a temperature between 135° and 150° C.
6. A fatty acid biguanide produce as described in claim 1, wherein the molar ratio of amine hydrohalide to dicyandiamide is in the range of from about 1:1 to 1:1.3.
7. A fatty acid biguanide as defined in claim 1, wherein the higher aliphatic hydrocarbon carboxylic acid is oleic acid.
8. A fatty acid biguanide as defined in claim 1, wherein the higher aliphatic hydrocarbon carboxylic acid is refined tall oil.
9. Leather of improved hydrophobic properties, containing from about 5 to 25% by weight, calculated on the dry weight of the unimpregnated leather, of fatty acid biguanide produced by reacting:
  (i) hydrohalide of a primary aliphatic amine, the aliphatic radical of which has from 12 to 20 carbon atoms, and
  (ii) dicyandiamide, in a molar ratio in the range of from about 1:0.8 to 1:1.5 at a temperature above 100° C. and up to about 160° C.,
    dissolving the reaction product in lower alkanol, neutralizing the reaction mixture to set free the biguanide base,
    separating from the reaction solution insoluble reaction products formed, adding to the separated solution from 0.5 to 2.5 equivalents, per equivalent of said amine, of higher aliphatic hydrocarbon carboxylic acid of from 12 to 20 carbon atoms and thereby reacting the latter with said biguanide base, and
    recovering the resulting fatty acid biguanide from the reaction mixture.
10. A composition for imparting long-lasting hydrophobic properties to leather, which contains as essential ingredients:
  (a) a fatty acid biguanide produced by reacting:
    (i) hydrohalide of a primary aliphatic amine, the aliphatic radical of which has from 12 to 20 carbon atoms, and
    (ii) dicyandiamide, in a molar ratio in the range of from about 1:0.8 to 1:1.5 at a temperature above 100° C. and up to about 160° C.,
      dissolving the reaction product in lower alkanol,
      neutralizing the reaction mixture to set free the biguanide base,
      separating from the reaction solution insoluble reaction products formed, adding to the separated solution from 0.5 to 2.5 equivalents, per equivalent of said amine, of higher aliphatic hydrocarbon carboxylic acid of from 12 to 20 carbon atoms and thereby reacting the latter with said biguanide base, and
      recovering the resulting fatty acid biguanide from the reaction mixture, and
  (b) a lower alkanol in sufficient amount to dissolve said biguanide therein.
11. Leather of improved hydrophobic properties according to claim 9, wherein said leather is vegetable tanned.
12. Leather of improved hydrophobic properties according to claim 9, wherein said leather is vegetable-chrome tanned.

References Cited

UNITED STATES PATENTS

| | | | |
|---|---|---|---|
| 2,304,113 | 12/1942 | Morgan et al. | 260—404.5 X |
| 2,324,354 | 7/1943 | Bindler et al. | 260—404.5 X |
| 2,343,920 | 3/1944 | Maxwell. | |
| 3,079,211 | 2/1963 | Paquet | 117—142 X |

WILLIAM D. MARTIN, Primary Examiner

H. J. GWINNELL, Assistant Examiner

U.S. Cl. X.R.

8—94; 260—404